US00RE34699E

United States Patent [19]

Copeland et al.

[11] E Patent Number: Re. 34,699

[45] Reissued Date of Patent: Aug. 23, 1994

[54] PROTECTIVE HEADGEAR AND DETACHABLE FACE PROTECTOR

[75] Inventors: Steve Copeland, Barrie; Roger Ball, Toronto, both of Canada

[73] Assignee: Itech Sport Products Inc., Ville St-Laurent, Canada

[21] Appl. No.: 12,645

[22] Filed: Feb. 3, 1993

Related U.S. Patent Documents

Reissue of:

[64] Patent No.: 5,093,936
Issued: Mar. 10, 1992
Appl. No.: 616,068
Filed: Nov. 20, 1990

[51] Int. Cl.[5] ..... A42B 1/22; A42B 1/08

[52] U.S. Cl. ..... 2/419; 2/424; 2/9; 2/410

[58] Field of Search ..... 2/9, 410, 411, 417, 2/418, 419, 422, 423, 424, 425, 416

[56] References Cited

U.S. PATENT DOCUMENTS

| | | | |
|---|---|---|---|
| 631,880 | 8/1899 | Ross | 2/418 |
| 2,946,063 | 7/1960 | Boyer | 2/418 |
| 3,221,340 | 12/1965 | Joffe | 2/417 |
| 3,239,842 | 3/1966 | Marchello | 2/423 |
| 3,329,968 | 7/1967 | Gordon | 2/418 |
| 3,471,865 | 10/1969 | Molitoris | 2/423 |
| 3,471,866 | 10/1969 | Raney | 2/418 |
| 3,513,481 | 5/1970 | Nickerson | 2/418 |
| 3,555,560 | 1/1971 | Rascke . | |
| 3,605,113 | 9/1971 | Marietta . | |
| 3,696,441 | 10/1972 | Littleton . | |
| 3,711,864 | 1/1973 | Dickstein . | |
| 3,783,450 | 1/1974 | O'Connor | 2/425 |
| 3,787,894 | 1/1974 | Goodman, Jr. | 2/418 |
| 3,925,821 | 12/1975 | Lewicki | 2/425 |
| 3,943,571 | 3/1976 | Boatman . | |
| 3,950,788 | 4/1976 | Lamb . | |
| 3,992,720 | 11/1976 | Nicolinas . | |
| 4,021,858 | 5/1977 | Neeld et al. | 2/9 |
| 4,028,743 | 6/1977 | Christensen | 2/9 |
| 4,031,564 | 6/1977 | Wood | 2/9 |
| 4,205,467 | 6/1980 | Salomon . | |
| 4,259,747 | 4/1981 | Taesler et al. . | |
| 4,292,692 | 10/1981 | Moretti et al. . | |
| 4,433,494 | 2/1984 | Courvoisier et al. . | |
| 4,620,379 | 11/1986 | Sartor . | |
| 4,719,709 | 1/1988 | Vaccari . | |
| 4,796,829 | 1/1989 | Pozzobon et al. . | |
| 4,825,566 | 5/1989 | Sartor . | |
| 4,841,649 | 6/1989 | Baggio et al. . | |
| 4,888,831 | 12/1989 | Oleson . | |
| 4,942,628 | 7/1990 | Freund . | |
| 5,042,093 | 8/1991 | Legendre . | |
| 5,129,108 | 7/1992 | Copeland et al. . | |
| 5,142,705 | 9/1992 | Edwards . | |

FOREIGN PATENT DOCUMENTS

| | | | |
|---|---|---|---|
| 962001 | 2/1975 | Canada . | |
| 33057 | 8/1981 | European Pat. Off. | 2/425 |
| 3300276 | 12/1984 | Fed. Rep. of Germany . | |
| 339469 | 10/1942 | Italy | 2/416 |
| 280042 | of 1914 | United Kingdom . | |
| 712161 | 9/1931 | United Kingdom . | |
| 512106 | 8/1939 | United Kingdom | 2/9 |
| 1528647 | 10/1978 | United Kingdom . | |

*Primary Examiner*—Clifford D. Crowder
*Assistant Examiner*—Michael A. Neas
*Attorney, Agent, or Firm*—Oblon, Spivak, McClelland, Maier & Neustadt

[57] ABSTRACT

A protective sports headgear comprised of a helmet member shaped to protect the top, rear, front and sides of a wearer's head. The helmet member has a rigid outer shell with an inner protective lining of shock absorbing material. A sizing harness is secured to the helmet and disposed inwardly thereof. The harness has a height adjusting band and a horizontal contour adjusting band. Adjustable sizing members are secured to the helmet and the adjusting bands to fit the bands on the head of a wearer to thereby space the head from the protective lining in at least some inner areas of the helmet member. The helmet is secured to the wearer's head by conventional retention members.

54 Claims, 8 Drawing Sheets

FIG. 6A
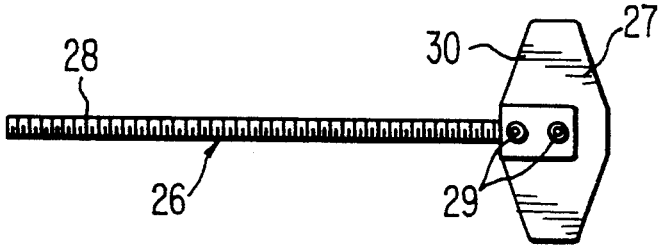
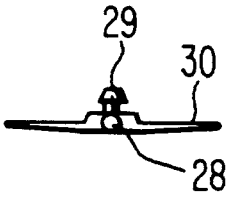
FIG. 6C
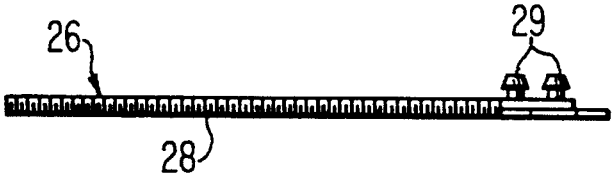
FIG. 6B
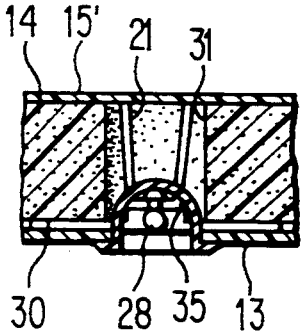
FIG. 7C
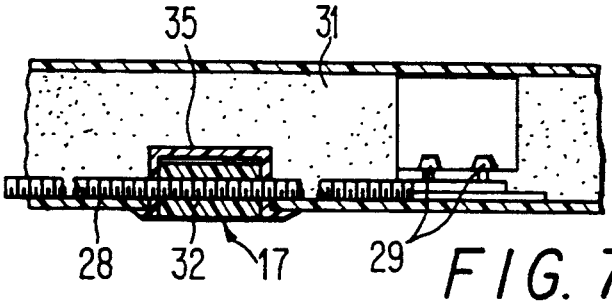
FIG. 7B
FIG. 7A
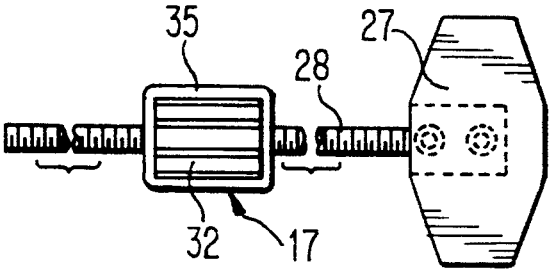
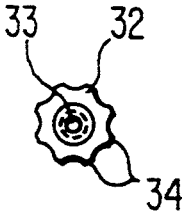
FIG. 8B
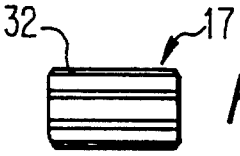
FIG. 8A
FIG. 9B
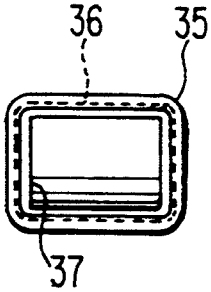
FIG. 9A
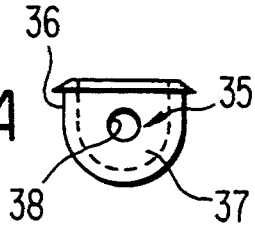

70
71
72
73
74
75
76
78
80
81
83
84
85
86
87
92
101
103
18A.
18B.

PROTECTIVE HEADGEAR AND DETACHABLE FACE PROTECTOR

Matter enclosed in heavy brackets [ ] appears in the original patent but forms no part of this reissue specification; matter printed in italics indicates the additions made by reissue.

*This is a reissue of U.S. Pat. No. 593,936 issued Mar. 10, 1992.*

BACKGROUND OF INVENTION

1. Field of the Invention

The present invention relates to a protective sports headgear which comprises a helmet member having a sizing harness secured in the helmet and adjustable to fit the wearer's head by means of finger adjusting members secured to the helmet and accessible from the outer face of the helmet.

2. Description of Prior Art

Protective headgears are worn in various types of sports such as hockey, football, cycling, just to name a few, and these have various shapes and forms and are provided with or without face protecting devices. Such known helmets have various disadvantages which have heretofore not been remedied. One of the disadvantages is that certain of these helmets do not provide adequate protection to the head of the wearer and one cause of this is usually because the helmet is not properly fitted to the head of the wearer. Another disadvantage of known helmets is that when they are snugly fit on the head of a wearer, they do not provide head ventilation and, accordingly, the wearer will sweat profoundly from the head often impairing his vision as well as making the wearer feel very uncomfortable. This is particularly so when the helmet is fit with a protection visor. The sweat will fog the visor and thereby impair the wearer's vision which could again be a cause of injury due to poor visibility. Another disadvantage of known helmets is that in certain sports, they are provided with faceguards which are attached by metal rivets or other type fasteners and such fasteners can cause injury to the wearer, particularly when they protrude inside the helmet.

Referring now more specifically to helmets utilized in the sport of hockey, it has become common practice to provide visors and faceguard frames secured to the helmet whereby to protect the edes and nose of the wearer or the entire face of the wearer including the ears. The majority of known visors often need to be cleaned when they fog up due to sweat generated by the wearer, it is often necessary to remove the entire helmet and to hinge the faceguard in order to have access to the inside surface of the visor. This is time-consuming and often the hockey player will continue playing the game with impaired vision thereby diminishing his abilities as well as making him more susceptible to injury.

SUMMARY OF INVENTION

It is a feature of the present invention to provide a protective sports headqear which substantially overcomes all of the above-mentioned disadvantages of the prior art.

Another feature of the present invention is to provide a protective sports headgear having a helmet member with a sizing harness secured inwardly thereof with adjustable bands which can be adjusted with the helmet positioned on the wearer's head by adjustable members provided on the outer surface of the helmet.

Another feature of the present invention is to provide a protective sports headgear which comprises a helmet having a sizing harness secured inwardly thereof to space the wearer's head from an inner protective lining in at least some inner areas of the helmet member and wherein vent holes are provided in the helmet to ventilate the wearer's head to reduce sweating and to make the helmet more comfortable. The sizing harness will accommodate any head size due to its flexibility in adjustment.

Another feature of the present invention is to provide a protective sports headgear having a faceguard frame and a visor hingedly secured to the frame whereby the visor can be easily hinged away from a sighting opening so as to clean the visor or to simply place it in a position of non-use when the wearer does not require same.

Another feature of the present invention is to provide an improved protective sports headgear having plastic-type fasteners secured thereto to retain various parts of the helmet construction and wherein the fasteners provide added protection to the wearer and wherein the construction and design of the helmet is an improvement over known helmets of the prior art.

According to the above features, from a broad aspect, the present invention provides a protective headgear' which comprises a helmet member shaped to protect the top, rear, front and sides of a wearer's head. The helmet member has a rigid outer shell with an inner protective lining of shock absorbing material. A sizing harness is secured to the helmet and disposed inwardly thereof The harness has a height adjusting band and a horizontal contour adjusting band. Adjustable sizing means is secured to the helmet and the adjusting bands to fit the bands on the head of a wearer and thereby spacing the head from the protective lining in at least some inner areas of the helmet member. Means is provided to secure the helmet to a wearer's head.

Another feature of the present invention is to provide an improved protective sports headgear for use in the sport of hockey and wherein an ear shield is secured to the helmet member and extends over an ear clearance area whereby to cover a substantial portion of a wearer's ear.

Another feature of the present invention is to provide an improved protective sports headgear having a helmet member comprised of a rigid outer shell and an inner protective lining of shock absorbing material secured to the shell by ribbed fasteners constructed of plastics material and which do not transfer impact.

Another feature of the present invention is to provide a faceguard frame securable to a helmet member to protect a wearer's face and wherein the faceguard frame is of mesh-like construction and has a sighting opening in an eye and nose region of the face of the wearer. A visor of clear plastics material is hingedly connected to the faceguard frame and hingeable upwardly of the sighting opening. Lock means is provided to immovably secure the visor in its position of use across the sighting opening. A half faceguard frame is also provided.

Another feature of the present invention is to provide a thermoformed plastic frame secured to a helmet member of a protective sports headgear to protect a goaltender's face. The thermoformed plastic frame has a face opening across which is secured a protective member. A pivoting throat guard is formed as a solid molded piece and secured to the frame by opposed pivot connectors and pivotal from a lower chin band section of the frame.

BRIEF DESCRIPTION OF DRAWINGS

A preferred embodiment of the present invention will now be described with reference to the accompanying drawings in which:

FIGS. 6A, 6B and 6C are plan, side and end views, respectively, of the sizing band connectors;

FIGS. 7A, 7B and 7C are plan, side and end views, respectively, showing how the sizing band connector is secured to the housing in which an adjustment knob is retained;

FIGS. 8A and 8B are side and end views, respectively, of the adjustment knob;

FIGS. 9A and 9B are side and top views, respectively, of the trough-like housing;

Figure 19A:
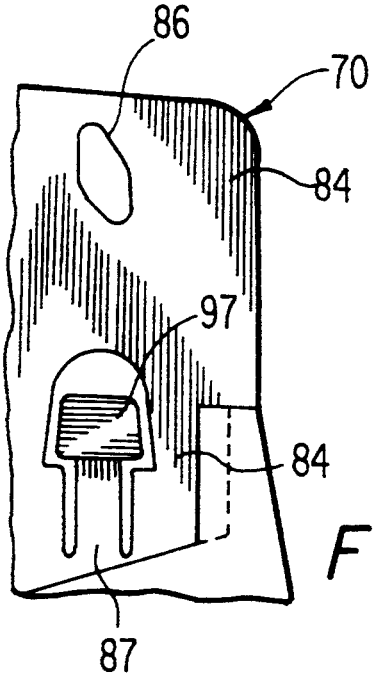
FIG. 19A is a side view showing the hinge connection and detachable lock means of the faceguard frame.
Figure 19B:
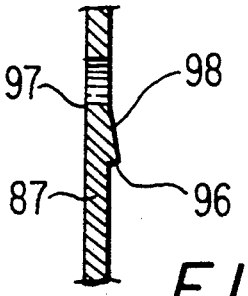
Figure 20:
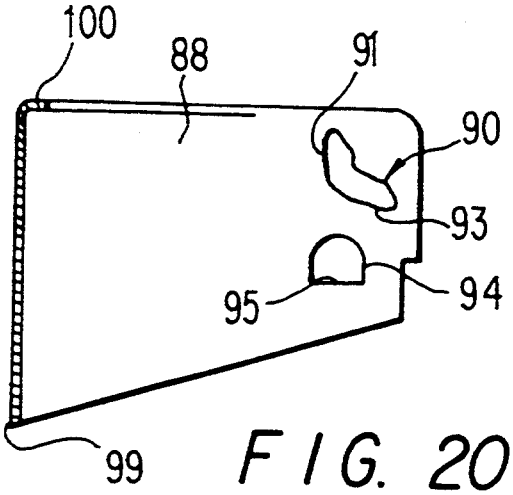
Figure 21:
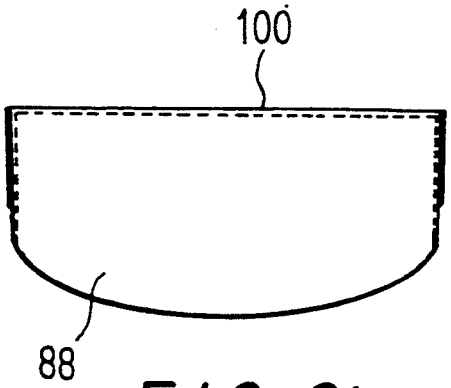
Figure 22:
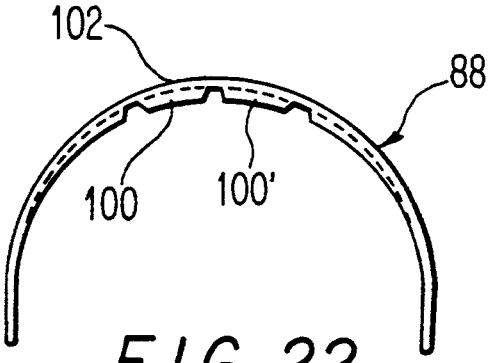
Figure 23:
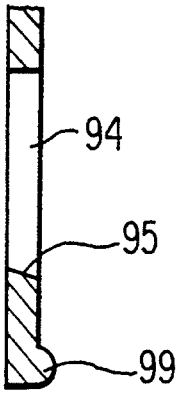
Figure 24:
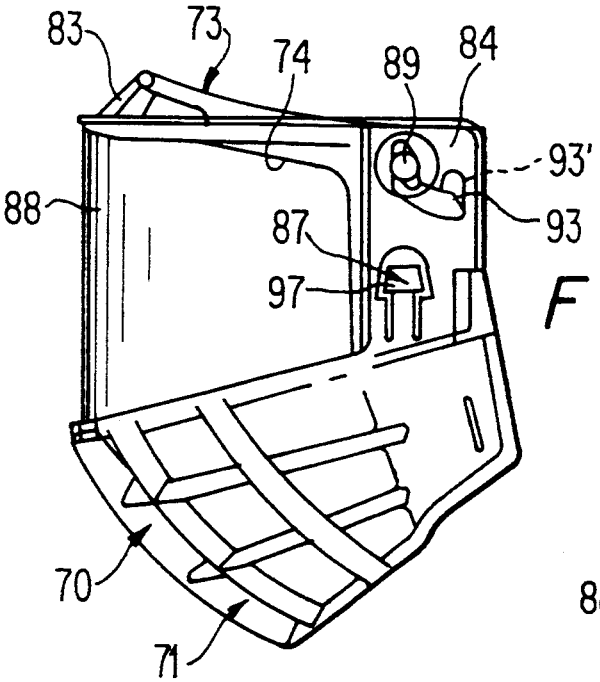
Figure 25:
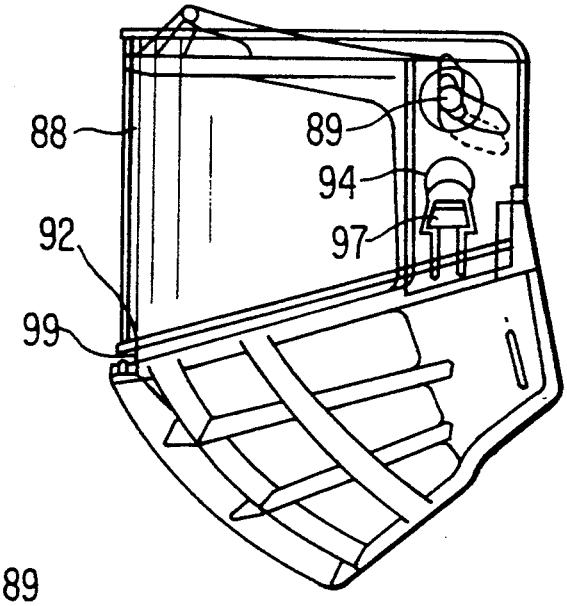
Figure 26:
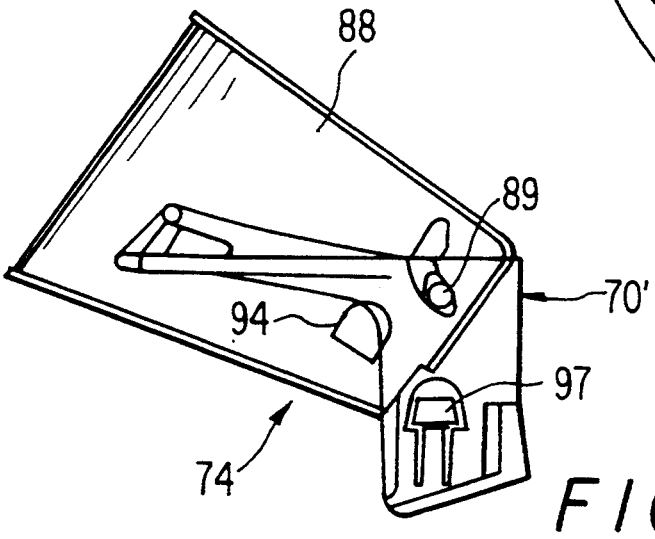
Figure 27:
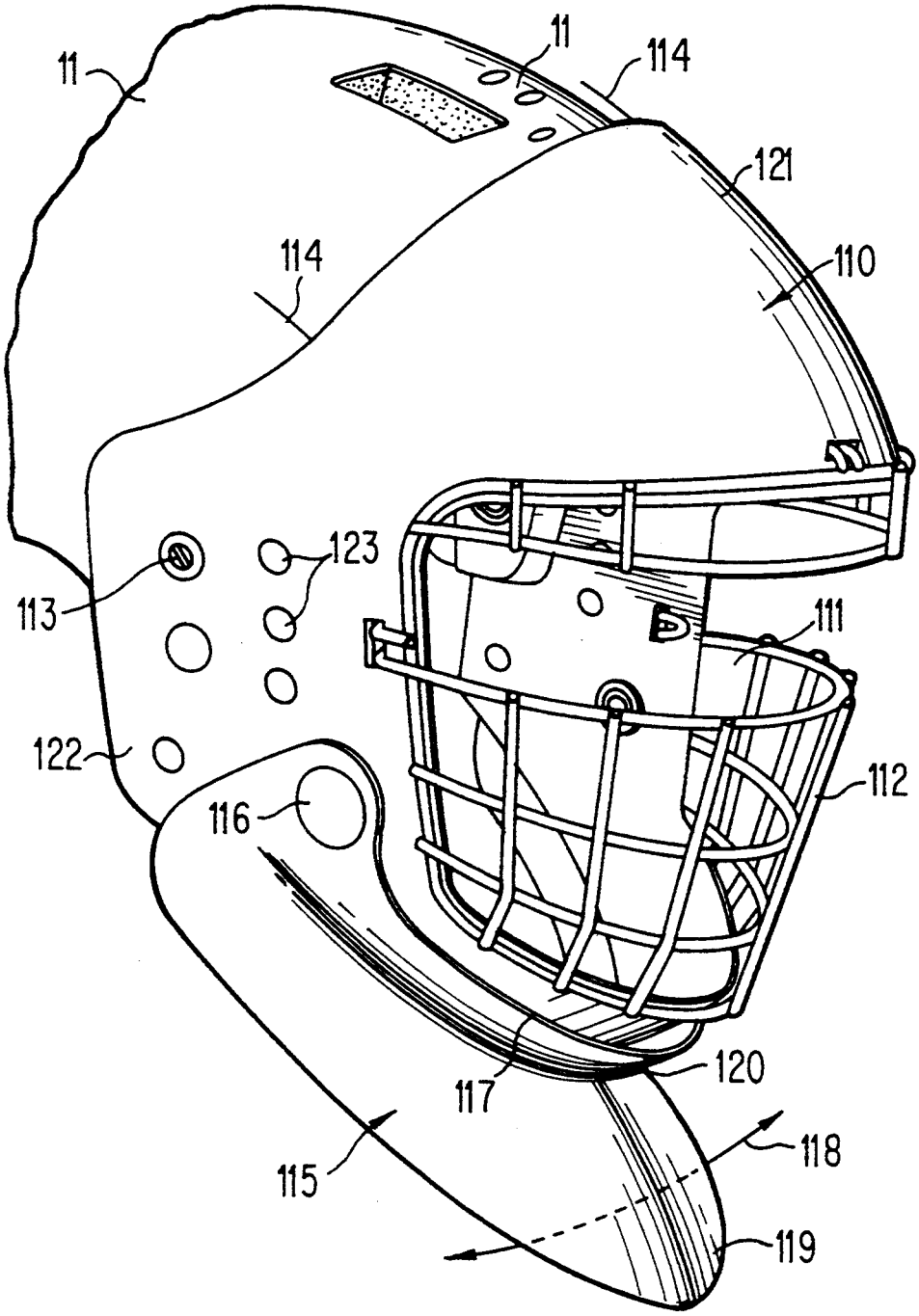

FIG, 19B is a section side view of the flexible retention finger of FIG. 19A;

FIG. 20 is a side view, partly sectioned, showing the construction of the visor and its attachment means to secure to the faceguard frame;

FIG. 21 is a front view of a visor;

FIG. 22 is a top view of the visor;

FIG. 23 is a fragmented section view of the retention bore which engages with the retention head of the flexible retention finger;

FIGS. 24 and 25 are side views showing the manner in which the visor is hinged to the faceguard frame;

FIG. 26 is a view similar to FIGS. 24 and 25 but showing the visor secured to a half faceguard; and FIG. 27 is a perspective view of a thermoformed plastic goalie faceguard frame for securement to a helmet member.

DESCRIPTION OF PREFERRED EMBODIMENTS

Figure 1:
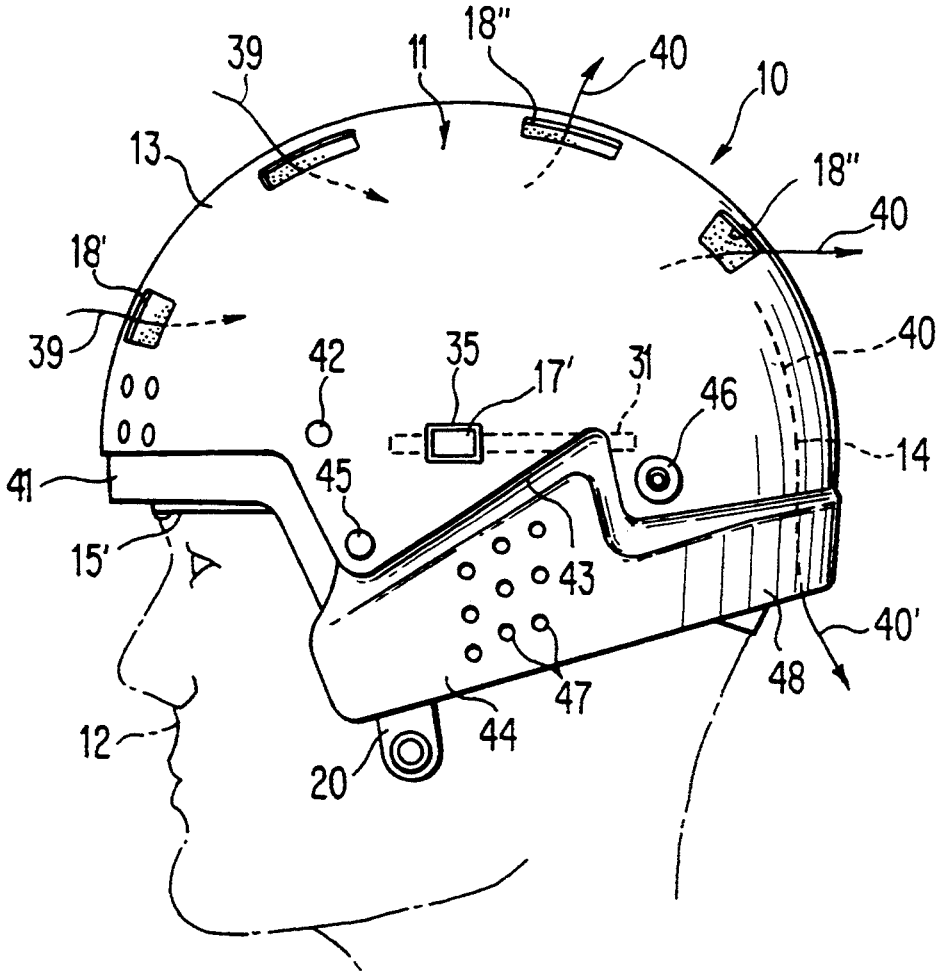
FIG. 1 is a side view of the protective sports headgear of the present invention.
Figure 2:
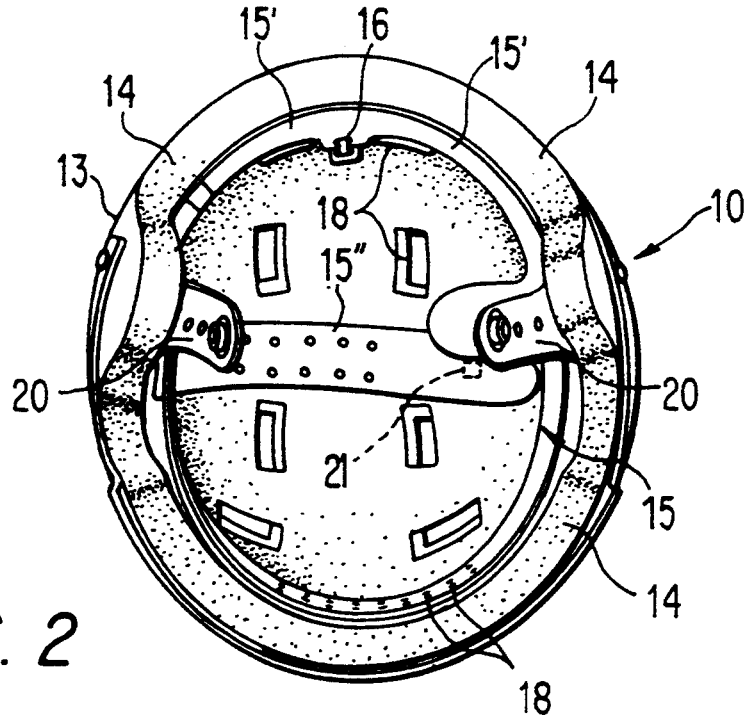
FIG. 2 is an inside view of the protective sports headgear of FIG. 1.
Figure 3:
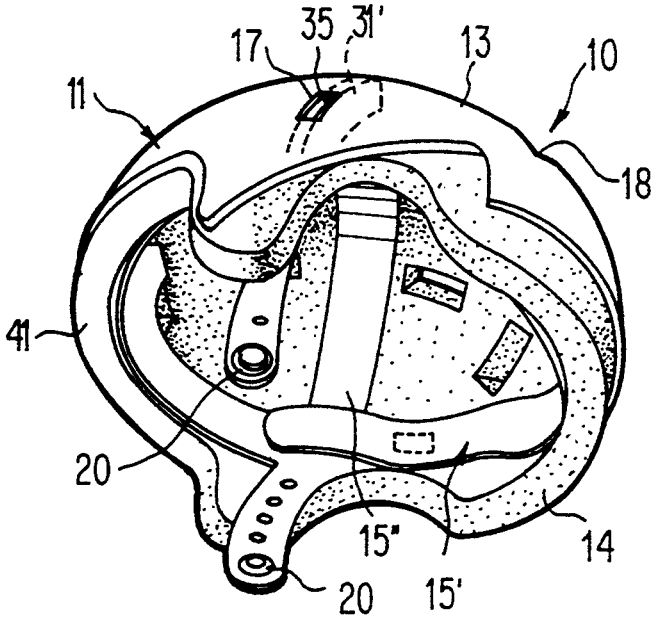
FIG. 3 is a perspective inside view illustrating the positioning of the head sizing harness.

Referring now to the drawings, and more particularly to FIGS. 1 to 3, there is shown generally at 10, the protective sports headgear of the present invention and particularly, but not exclusively, a sports headgear. The headgear comprises a helmet member 11 which is shaped to protect the top, rear, front and sides of a wearer's head 12. The helmet member has a rigid outer shell 13 with an inner protective lining 14 formed of thick polyurethane foam or other rigid foam-like material being light weight and having shock absorbing properties. The shell has a uniform outer surface with no ridges to catch when the wearer's head hits objects. The uniform surface also deflects blows imparted to it.

Figure 4:
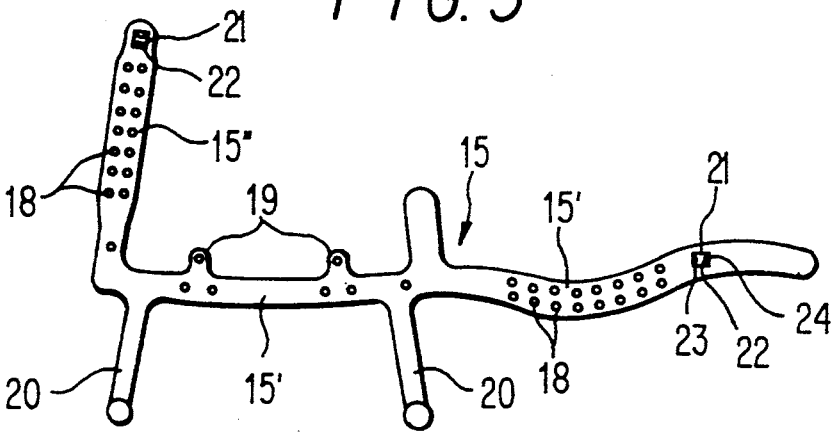
FIG. 4 is a plan view illustrating the shape and construction of the sizing harness.

A sizing harness 15 is secured to the helmet by fasteners 16, which will be described later, at various predetermined locations along the band, so as to secure same to the helmet member while still providing adjustability about the wearer's head. As shown in FIG. 4, the sizing harness 15 is made as a one-piece band of flexible material, herein a flexible plastics material, and defines a horizontal contour-adjusting hand section 15' and a height-adjusting ban section 15''.

Adjustable sizing means, herein in the form of adjustment knobs 17, are provided on each side of the helmet and accessible from the outer face of the rigid outer shell 13. The knob 17' as shown in FIG. 1 is utilized to adjust the horizontal contour band section 15' while the adjustment knob 17, as shown in FIG. 3, is utilized to adjust the height-adjusting band section 15''. Accordingly, the bands can be fitted comfortably about the wearer's head and by such means can space the wearer's head in at least some section of the helmet member to provide a comfortable fit and also to permit ventilation through the helmet through the vent holes 18' and 18'' extending through the outer shell 13 and the inner protective lining 14. Also, when an impact is absorbed by the helmet, it is easy to readjust the harness if it loosens during impact as the blow is absorbed.

Referring again to FIG. 4, it can be seen that certain parts of the band are provided with holes 18 which reduces the formation of sweat against the wearer's head. Lugs 19 are also formed integral with the band to provide securement of same to the helmet member. Chin strap connecting bands 20 are also formed integral with the harness. Also formed integral with the adjustment horizontal and height adjustment band sections 15' and 15'' is a connector bridge 21 having an elevated top wall 24 as shown at 22. A pair of connecting holes 23 are provided in the top wall 24 of the connector bridge 21 whereby to connect to adjustment members 25 as shown in FIG. 5.

Referring now additionally to FIGS. 5 to 9B, there will be described the manner in which the harness is adjustable. As shown in FIGS. 6A to 6C, the adjustment members comprise a band connector 26 provided with an attachment element 27 securable to a respective one of the adjusting band sections 15' and 15''. An elongated flexible threaded member 28 is integrally formed with the attachment element 27. One or more prongs 29 are formed in the attachment element 27 and protrude thereabove to engage within the connecting holes 23 provided in the connector block 21 of the harness. The securement of the attachment element 27 to the connector block could also be made by other fastening means, such as a separate connector pin.

Figure 5:
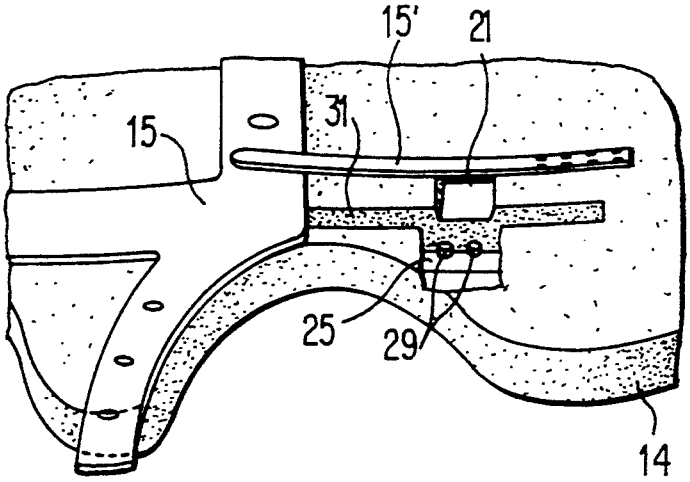
FIG. 5 is a fragmented perspective view showing the manner in which the sizing harness is secured to an adjustment member accessible from the outer surface of the helmet.
Figure 11B:
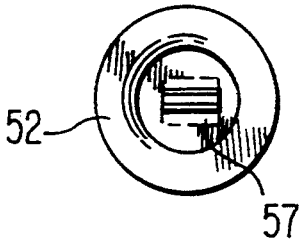
FIGS. 11A and 11B are similar views to FIGS. 10A and 10B but showing the rib fastener from the side thereof.

A flat wing element 30 is formed integral with the attachment element 27 and is retained captive between an inner face of the outer shell 13 and the protective lining 14 and extends -to each side of a guide channel 31, as shown in FIG. 5. The guide channels are formed within the inner protective lining 14 and extend therethrough. The location of the horizontal guide channel 31 is shown in phantom lines in FIG. I and the vertical guide channel 31' is shown in phantom lines in FIG. 3. The size of this channel is selected so that the connector bridge 31 is closely guided therein so as to maintain the adjustable band sections in proper position inside the helmet.

FIGS. 8A and 8B illustrate the construction of the adjusting knobs 17 and as herein shown, they are comprised as a cylindrical wheel 32 having an inner threaded bore 33 and a plurality of finger engaging ribs 34 formed in an outer surface thereof and extending parallel to the through bore 33 for rotating the cylinder knob 32 about the elongated threaded member 28, as shown in FIG. 7C.

Referring additionally to FIGS. 9A and 9B, there is shown the construction of a trough-like housing 35 which is secured in locating holes provided in the outer shell 13 and inner protective lining 14. The trough-like housing 35 has an arcuate side wall 36 and opposed U-shaped end walls 37. Holes 38 are provided in the end walls to accommodate the passage of the elongated flexible threaded member 28 therethrough, as shown in FIGS. 7A to 7C. The adjusting cylinder knob 32 is located within the housing 35 and is in threaded engagement with the threaded member 28 extending therethrough, as shown in FIG. 7C. Accordingly, by turning the knob 32, the threaded member 28 is displaced axially through the housing and thereby displaces the adjusting band sections 15' and 15'' which are connected to the attachment element 27. FIG. 7C shows the position of the adjustable band section 15' riding on the top inner surface of the inner protective lining 14 with the wing element 30 being positioned in sliding fit between the outer shell 13 of the helmet and the protective lining 14 and extending beyond the edges of the guide channel 31. Accordingly, by rotating the adjusting knobs 17 and 17', the band is fitted about the wearer's head and this can be done while the helmet is positioned on the wearer's head. The adjustment knobs 17 also provide for very finite adjustment of the band and thus adding to the comfort and proper sizing. It is also not necessary to remove the helmet to make the sizing adjustment. It is also pointed out that the cylinder knobs are disposed along different axes to indicate to which of the bands it is connected and as hereinshown, the adjustment knob of FIG. 1 is disposed horizontally to indicate it is attached to the horizontal band section 15' whilst the adjustment knob 17 is disposed vertically to indicate that it is connected to the vertical or height adjustment band section 15''.

Referring to FIG. 1, it can be seen that a plurality of vent holes 18 are provided within the outer shell and the inner protective lining with the front vent holes 18' being disposed horizontally to admit more air inside the helmet member 11. Accordingly, as the wearer displaces himself, air enters the helmet through the frontal air holes in the direction of arrows 39 and exit through the top holes 18'' as shown by arrows 40. Some ventilation also takes place through the back of the neck as illustrated by arrow 40' due to the spacing provided by the harness. This permits the wearer's head to be cooled thereby generating less sweat and maintaining the wearer more comfortable to perform his sports activity. The height adjusting band maintains a clearance between the inner surface of the inner protective lining 14 and the top of the wearer's head to achieve this feature. Of course, this clearance will vary depending on the size of the wearer's head and the size of the helmet being worn. The vent holes 18 are herein shown as disposed along a central band portion of the helmet from a frontal head area to a rear head area. Although these are shown as being of substantially rectangular configuration, they could also be shaped differently and disposed in spaced-apart pairs or again differently. Channels (not shown) could also be formed inside the lining and disposed in alignment with the vent holes.

Referring again to FIGS. 1 to 3, it can be seen that the inner foam protective lining 14 extends beyond at least the forehead and neck portion of the rigid outer shell. A protective shield 41 formed of flexible plastics material extends over a portion of the rigid foam material 14 in the forehead portion of the headgear to protect the foam in this area. This shield is immovably secured in position by means of plastic fasteners 42.

As can be seen from FIG. 1, the helmet member defines an ear clearance area 43 on each side thereof. An ear shield 44 is secured to the helmet by suitable fasteners such as at 45 and 46 and extends over the ear clearance area and depends therefrom to cover a substantial portion of a wearer's ear. The car shield 96 is molded from a flexible plastics material and protrudes outwardly of the plane of the rigid outer shell. Vent holes 47 are provided on the shield to vent this area and also not to shield the ear from sounds so that the wearer's audibility is not impaired. This ear shield is molded as a U-shaped member with an ear shield section 44 at opposed ends of the member and a connecting band section 48 being disposed intermediate of the ear shields and overlying a rear extension portion of the inner protective lining 14 in a rear portion of the helmet. This provides added protection for the inner protective lining in this area of the wearer's head. Accordingly, this construction provides added protection to the wearer's head in the ear and neck portion areas.

Figure 10B:
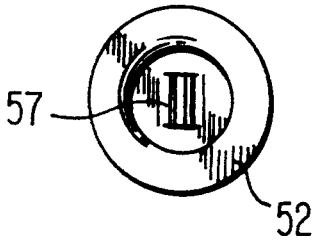
FIGS. 10A and 10B are side and top views, respectively, of rib fasteners and stem-engaging cup member as seen from the end edge thereof.
Figure 10A:
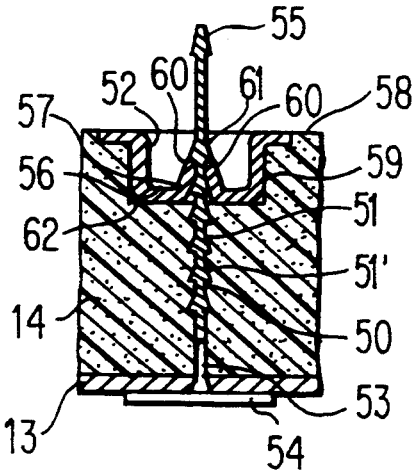
Figure 11A:
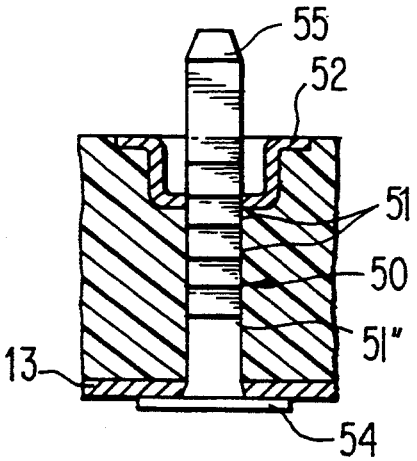

Referring now to FIGS. 10A, 10B, 11A and 11B, there is shown the construction of rib fasteners 50 which are constructed of plastics or nylon-type material. The rib fasteners are provided with a rib stem member 51 and a stem-engaging cup member 5. The stem member 51 is an elongated straight flat stem member, as shown in FIG. 11A, and is provided with opposed transverse, equidistantly spaced attachment ribs 52 on opposed flat side walls 53 of the stem. A flat transverse head 54 is provided at one end of the stem. A tapered locating free end 55 is provided at the opposed end of the stem. The cup member 52 has a recessed bottom wall 56 with a straight rectangular slot 57 provided centrally therein for receiving the free end and a portion of the ribbed stem member therethrough. A circumferential flange 58 extends about the side wall 59 of the cup member which is herein shown as a circular cup member. A pair of retention flexible shoulders 60 are disposed on opposed sides of a rectangular slot 57 and have an inward inclination to engage with the stem between the ribs, as shown in FIG. 10A.

The ribs 51 are provided with outwardly sloping side walls 51' and a transverse retention rear wall 51". The flexible shoulders 60 of the cup member are displaced outwardly by the sloping side will 51' when the stem is pushed through the rectangular slot 57. Each of the flexible shoulders 60 have a flat engaging top edge 61. This top edge 61 engages with the transverse retention rear wall 51" of the ribs to prevent the stem from being pulled back from the rectangular slot of the stem engaging cup. It is also pointed out that the side walls 59 of the cup member are longer than the distance from the leading edge of a rib sloping side wall 51' disposed on top of the pair of retention shoulders 60 so that the stem can be severed at the rib leading edge so that the severed stem does not protrude beyond the circumferential flange 58 of the cup. This provides added security inside the lining of the headgear not to touch the wearer's head. The stem and cup members are molded from pliable plastic material. As shown in FIG. 10A, the cup member 52 is disposed in a circular bore 62 formed in the inner surface of the protective material 14. The head 54 of the stem rests on an outer surface of the rigid outer shell 13.

Figure 12:
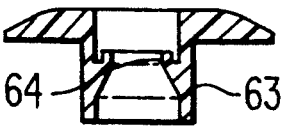
FIG. 12 is a section view of a female lug fastener constructed of plastics material.

FIG. 12 shows the construction of a female-type lug fastener 63 which is utilized to secure various parts to the helmet member. The female lug fastener is constructed from a plastics material and provided with an inner flexible rim 64 which flexes out to allow the passage of a male snap fastener 65 therein. The male snap fastener is provided with a retention head 66 and a flat outer head 67. These fasteners are all constructed of plastics material to provide added security to the wearer and are preferable over metal fasteners.

Referring now to FIGS. 14 to 18, there is shown the construction of a one-piece molded clear plastic faceguard frame 70 constructed in accordance with the present invention. The faceguard frame is of mesh-like construction and is comprised of a ribbed cage section 71 disposed below the eye and nose region 72 of a wearer's face whereby to protect the mouth, chin, neck and lower face of the wearer. A forehead section 73 is disposed in line with the forehead of a wearer and is provided for hinge attachment with the helmet member 11. A large sighting area 74 is defined between the forehead section 73 and the ribbed cage section 71.

Figure 18A:
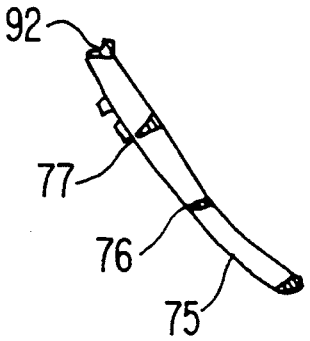
FIGS. 18A and 18B along section lines A—A and B of FIG. 16.
Figure 18B:
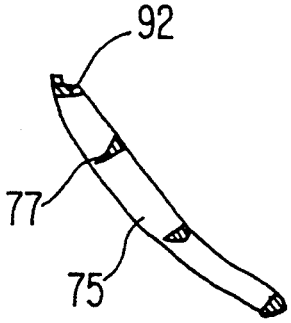

The ribbed cage section 71 is constructed of a plurality of horizontal and transverse ribs 75 and 76 respectively, as can be seen from FIGS, 18A and 18B and which are spaced apart a predetermined distance to provide adequate protection. The ribs are also of substantially triangular cross-section, as shown in FIGS. 18A and 18B, with the apex 77 of these ribs being located exteriorly of the cage section and aligned with the cone of vision of the sighting opening not to impair the wearer's vision. The forehead section 73 is provided with a rear rib 78 rearwardly of a top edge thereof. This rib is received within an integrally formed frame attachment hinge member 79 as shown in FIGS. 14A to 14C.

Figure 13:
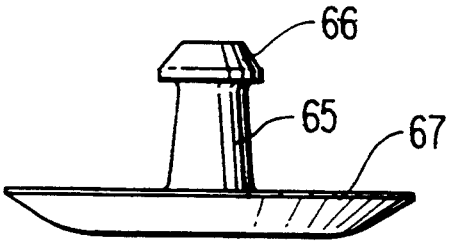
FIG. 13 is a side view of a male snap fastener.
Figure 14B:
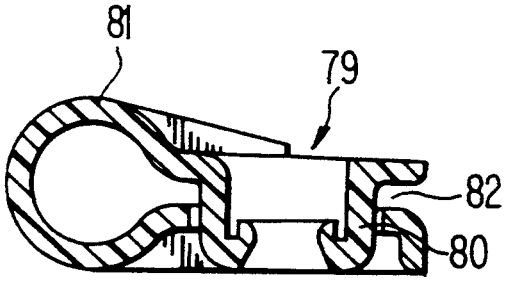
FIGS. 14A, 14B and 14C are side, section and plan views of a frame attachment hinge member constructed of plastics material.
Figure 14A:
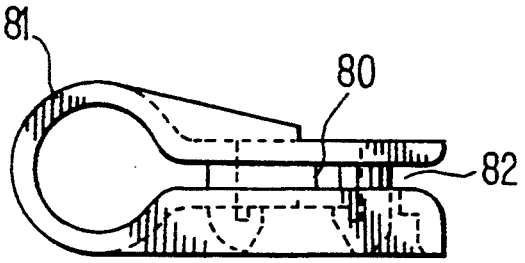
Figures 14C, 15, 16, 17:
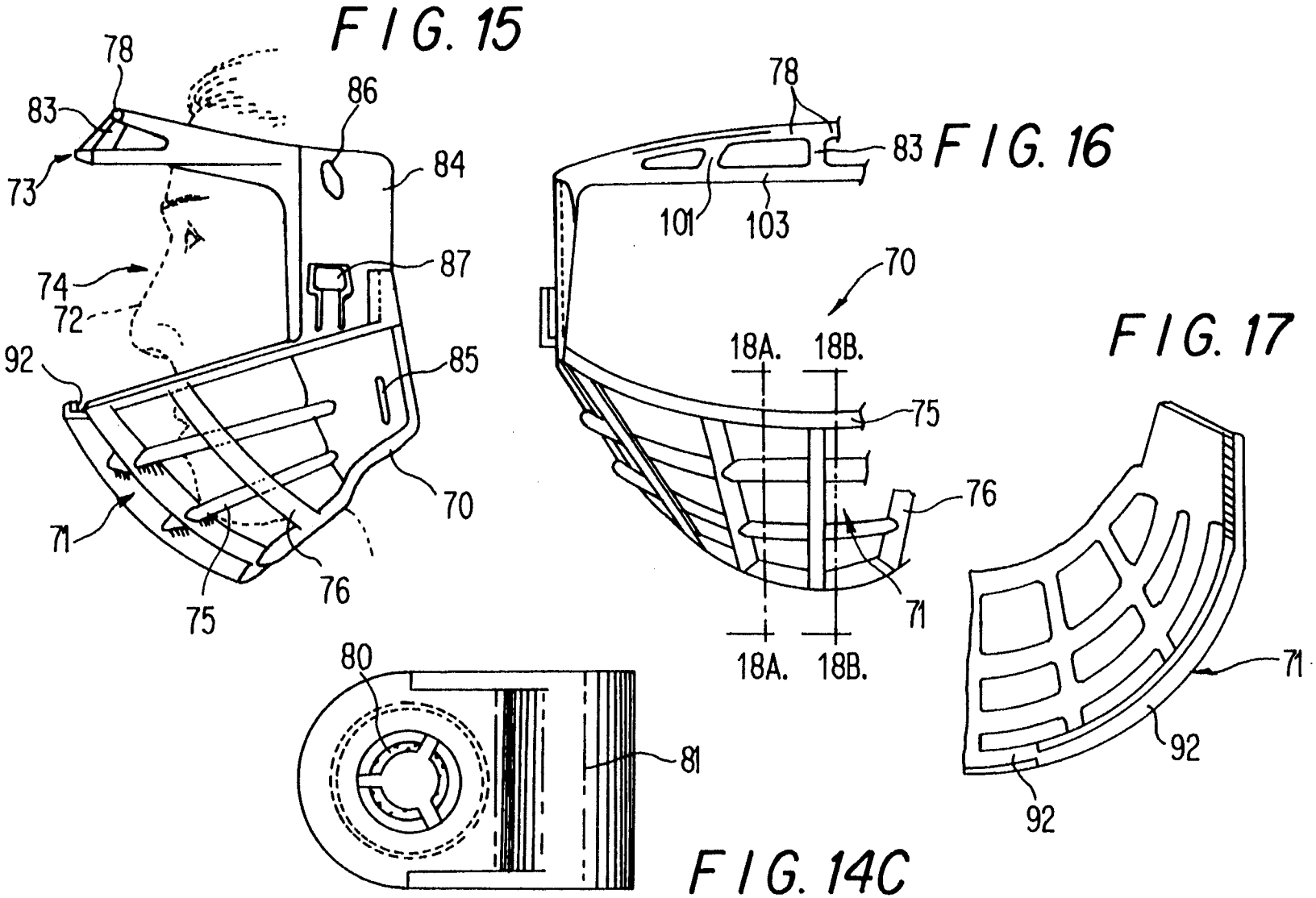
FIG. 15 is a side view of a faceguard frame constructed in accordance with the present invention.
FIG. 16 is a fragmented front view of the faceguard frame of FIG. 1.
FIG. 17 is a top inside view of the rib cage section of the faceguard frame.

As shown in FIGS. 14A to 14C, the frame attachment hinge member is an integrally formed member of flexible plastics material and defines a female connector section 80 for receiving a male snap member, such as the member 65 shown in FIG. 13, whereby to secure the frame attachment member 79 to the helmet member. Retention loop section 81 is formed integral with the female connector and is positioned about the rib member 78 on the forehead section of the faceguard frame 70. The retention loop 81 has a flexible throat opening 82 disposed rearwardly thereof and extends about the female connector 80 to lock the opening 82 when the male snap member 65 is engaged with the female connector 80. In this manner, the faceguard frame is hingedly retained by the frame attachment member to the front forehead portion of the helmet member. Preferably, two of such frame attachment hinge members are provided one on each side of the central rib 83 provided in the forehead rib section 73.

The faceguard frame 70 is also provided with integrally formed opposed rear wall sections 84 disposed behind the cone of vision of the headgear and a slot 85 is formed in a bottom comer thereof through which an attachment strap is secured to connect the faceguard frame 70 to opposed sides of the helmet member, in a manner well known in the art. A visor hinge connecting hole 86 is provided in an upper area of the rear wall sections 84 whereby to receive a visor hinge member, as will be described later. A lock retention finger 87 is also formed integral with the rear wall section 84 and its function will also be described later.

Referring now additionally to FIGS. 19A to 26, and more particularly to FIGS. 24 to 26, it can be seen that a clear plastics visor 88 is hingedly connected on the hinge pin fastener 89 to the faceguard frame 70 whereby to overlie the sighting opening 74 to protect the eye and nose region of the face of a wearer. As shown in FIGS. 20 to 23, the visor 98 is provided with an elongated slot 90 formed on opposed side end portions thereof for connection with the pivot connector 89. The slot 90 has a top vertical section 91 to permit the visor to be displaced vertically for nesting and removal from locating ledges 92 formed along the top edge of the ribbed cage section 71 below the sighting opening 74. The slot 90 further defines a rearwardly extending depending section 93 to permit the visor to hinge upwardly and outwards as shown in FIGS. 25 and 26, respectively. A retention bore 94 is disposed below the slot 90 and has a straight bottom sloping edge 95, as better seen in FIG. 23, for mating retention with an undercut edge 96 of the lock retention finger 87, as better shown in FIG. 19B. As shown in FIG. 19A, the lock retention finger is integrally molded with the faceguard frame which is constructed of a clear plastics material. The head section 97 of the retention finger 87 is provided with an outwardly protruding wall 98 so that the retention ledge 96 extends outwardly of the outer face of the rear wall section 84 of the faceguard frame 70. The hinge connection 89 maintains the retention bore 94 of the visor perfectly aligned with the head 97 of the lock retention finger 87 so that the head sloping wall 98 will cause the finger 87 to flex slightly inwardly of the faceguard frame when hinged thereover and as soon as the retention bore 94 is aligned with the head 97, it will snap or click into position locking the visor to the faceguard frame with the lower edge 99 of the visor resting on the support ledges 92. The clicking sound assures the wearer that the visor is locked in position.

The visor 88 is also provided with a locating flange 100 in a top edge thereof to guidingly position the visor relative to the vertical ribs 83 and 101 provided in the forehead section 73 of the faceguard frame 70. Slots 102 are defined between flange sections 100' to accommodate the ribs 83 and 101. Accordingly, the locating flange 100 also sits on the horizontal frontal rib 103 of the forehead section 73.

As can be seen in FIGS. 24 to 26, in order to hinge the visor 88 upwardly of the sighting opening 74, it is firstly necessary to depress the head 97 of the lock retention finger 87 to disengage the ledge 96 from the ledge 95. The visor can then be pushed upwardly off its nesting ledges, as shown in FIG. 25. The hinge pin 89 has thus moved to the bottom of the vertical section 91 of the visor connecting slot 93. The visor is then pushed outwardly and upwards, as shown in FIG. 26, and the hinge pin 89 is then located in the bottom portion of the rearwardly depending slot section 93. In this position, the wearer has clear vision and this permits the visor to clear itself by ventilation of the fogged up area. It also permits better ventilation of a wearer's face permitting the wearer to wipe his forehead or eyes. The hinge pin 89 may be formed from the connector described in FIGS. 12 and 13 or otherwise and provide a rigid frictional retention fit so as to maintain the visor in its retracted position as shown in FIG. 26. Alternatively, it is conceivable that the bottom portion of the slot section 93 be provided with an upper end section 93' (see FIG. 24) in which the hinge pin 89 would enter to maintain the visor supported as shown in FIG. 26.

As is shown in FIG. 26, the faceguard frame 70' is herein shown as a half-frame to support the visor 88 only. The fastener 89 in this application goes into the helmet as well as through the frame 70' and the visor 88. With this frame, the eyes and nose area of the face only is protected.

Referring now to FIG. 27, there is shown a thermoformed plastic frame 110 secured to the helmet member 11 whereby to protect a goaltender's face. The plastic frame 110 has a face opening 111 across which is secured a protective grill member 112, well known in the art, and which is usually formed from steel wires welded together. The plastic frame 110 of the present invention is pivotally secured to the helmet member 11 by the pivot fastener 113 whereby the frame 110 can be displaced rearwardly along the direction of arrows 114 to clear the face of the wearer. A pivoting throat guard 115 is pivotally secured by connector 116 to the thermoformed plastic frame 110 and pivots downwardly from the lower chin band section 117 of the frame 110 in the direction as shown by double arrowhead 118.

The throat guard 115 has an integrally formed bib section 119 which extends outwardly of an upwardly extending ledge section 120 which mates or which is closely spaced to the chin band 117 thereby the chin band will restrict the upward displacement of the throat guard 115 so that it does not pivot above the chin band.

The thermoformed plastic frame 110 is provided with an integrally formed rearwardly sloping forehead section 121 which overlies the frontal portion of the helmet member 114 and outwardly flared side wings 122 which protects and overlaps the ears of a wearer. A plurality of holes 123 are provided in the side wings for ventilation and not to impair the audibility of the wearer.

It is within the ambit of the present invention to cover any obvious modifications of the invention described herein provided such modifications fall within the scope of the appended claims.

We claim:

1. A protective headgear comprising a helmet member shaped to protect the top, rear, front and sides of a wearer's head; said helmet member having [a rigid] *an* outer shell with an inner protective lining of shock absorbing material, a sizing harness secured to said helmet and disposed inwardly thereof, said harness having a [height adjusting band and a] horizontal [contour-adjusting] *adjusting* band, and adjustable sizing means secured to said helmet and said adjusting [bands] *band* to fit said [bands] *band* on the head of a wearer and thereby spacing said head from said protective lining in at least some inner areas of said helmet member, said adjustable sizing means having [two] *an* adjustment [members] *member* secured to said outer shell and spaced from an inner surface of said protective lining and accessible outwardly of said shell, said sizing harness being a [one-piece] flexible [band having a] head [contour] band [section constituting said horizontal contour band], [and a transverse integral band section constituting said height adjusting band,] and connecting means secured to [each] *a displaceable attachment portion on said band* [sections] and [a respective one of] said [two] adjustment [members, each] *member, another portion of said band being immovably secured to said headgear,* said adjustment member having an attachment element securable to [a respective one of] said connecting means and an elongated flexible member having thread engaging means at least along a section thereof, and a thread engaging stationary adjustment knob secured to said outer shell and in threaded engagement with said elongated flexible member to pull said flexible member therethrough and displace [its associated] *said* band [section], said thread engaging stationary adjustment knob being located in a trough-like housing secured to said outer shell, said elongated flexible member extending across opposed end walls of said housing with said adjustment knob in threaded engagement therewith and retained between said opposed side walls by said elongated flexible member, and means to secure said helmet to a wearer's head.

2. A headgear as claimed in claim 1 wherein said adjustment knob is a cylinder knob having an inner threaded bore and a plurality of finger engaging ribs formed on an outer surface thereof and extending parallel to said through bore for rotating said cylinder knob about said elongated flexible member to cause said elongated flexible member to be displaced axially through said cylinder.

3. A headgear as claimed in claim 1 wherein said attachment element comprises at least one prong projecting adjacent an attachment end of said elongated flexible member [each of at least one,] said *at least one* prong engaging with one of a plurality of holes provided in a connector bridge secured adjacent a free end of said band sections, said connector bridge being located in a guide channel formed in said inner protective lining.

4. A headgear as claimed in claim 3 wherein a flat wing element is formed integral with said attachment end of said elongated flexible member and being captive between an inner face of said outer shell and said protective lining and extending to each side of said guide channel.

5. A headgear as claimed in claim 3 wherein [aid] *said* connector bridge is formed integral with said band sections adjacent said free ends and having an elevated top wall in which said plurality of holes are located.

6. A headgear as claimed in claim 4 wherein said band connector is integrally molded from a plastics material.

7. A headgear as claimed in claim 2 wherein there are two of said adjustment knobs *provided in the form of cylinder knobs, two of said trough-like housings, and two of said bands, one of said bands being a horizontal adjusting band and the other of said bands being a height adjusting band, said cylinder knobs* each located in a respective one of said trough-like housings and disposed on a respective side of said outer shell, said [shells] *cylinder knobs* being disposed such that said cylinder knobs extend along different axes to indicate to which of said bands it is connected.

8. A headgear as claimed in claim 1 wherein said [one-piece flexible] band is further provided with a pair of chin strap attachment arms having fastener locating holes adjacent free ends thereof.

9. A headgear as claimed in claim 8 wherein there is further provided band securing lugs formed integral with said band to secure said band inside said inner protective lining.

10. A headgear as claimed in claim 8 wherein a plurality of vent holes are provided in at least some sections of said band.

11. A headgear as claimed in claim 1 wherein said helmet member is a sports helmet and wherein vent holes are provided in said helmet member and extending through said outer shell and said protective lining, said [height adjusting] band maintaining the head of a wearer spaced from at least a top innere area of said protective lining so that the wearer's head is ventilated by air flowing through said helmet through said vent holes.

12. A headgear as claimed in claim 11 wherein said vent holes extend along a central portion of said helmet from a frontal head area to a rear head area.

13. A headgear as claimed in claim 12 wherein said vent holes are of substantially rectangular configuration and disposed in spaced apart pairs along said central portion, a front and rear pair of vent holes being disposed transverse to said central portion, and at least one intermediate pair of vent holes disposed axially with said central portion.

14. A headgear as claimed in claim 1 wherein said helmet member has a uniform outer surface, said protective lining being formed of rigid foam material and extends beyond at least a forehead and neck portion of said rigid outer shell, said helmet being a hockey helmet.

15. A headgear as claimed in claim 14 wherein a protective shield extending over a portion of said rigid foam material extends beyond said forehead portion and immovably secured in position to protect said foam material.

16. A headgear as claimed in claim 1 wherein said helmet member defines an ear clearance area on each side thereof, and an ear shield secured to said helmet and extending over said ear clearance area and depending therefrom to cover a substantial portion of a wearer's ear.

17. A headgear as claimed in claim 16 wherein said ear shield is a molded shield protruding outwardly of the plane of said rigid outer shell, and vent holes disposed in said ear shield.

18. A headgear as claimed in claim 17 wherein said ear shield is a one-piece molded plastic shield defining a U-shaped member having said ear shield in opposed free end regions thereof, and a connecting band intermediate said ear shield, said connecting band overlying a rear extension portion of said inner protective lining in a rear portion of said helmet, and fastener means to secure said shield to said helmet.

19. A headgear as claimed in claim 1 wherein a faceguard frame is secured to said helmet member to protect a wearer's face, said faceguard frame being of mesh-like construction and having a sighting opening in at least an eye region of the face of a wearer, and a visor of clear plastics material hingedly connected to said faceguard frame by pivot connections so that said visor may be hinged upwardly of said sighting opening, and lock means to immovably secure said visor in its position of use across said sighting opening.

20. A headgear as claimed in claim 19 wherein said visor is a curved shaped visor having hinge connection means adjacent opposed side end portions thereof for connection with a pivot post secured on opposed sides of said faceguard frame in an upper rear region thereof and lock connection means for connection with said lock means.

21. A headgear as claimed in claim 20 wherein said hinge connection means is comprised of an elongated slot formed in said visor, said slot having a top vertical section to permit said visor to be displaced vertically for nesting and removal from visor locating ledges of said faceguard frame, and a rearwardly extending depending section to permit said visor to hinge upwardly and outwards.

22. A headgear as claimed in claim 20 wherein said lock means is provided by a retention bore formed in said visor and aligned with a retention head of a flexible retention finger secured to said faceguard frame.

23. A headgear as claimed in claim 22 wherein said retention finger is integrally molded with said faceguard frame, said retention head having an outwardly protruding retention ledge forming a straight undercut edge under said ledge, said retention bore having a straight bottom sloping edge for mating retention with said undercut edge.

24. A headgear as claimed in claim 21 wherein said visor locating ledges includes an upper support ledge formed on top of a rib cage section of said faceguard frame positioned below said sighting opening.

25. A headgear as claimed in claim 24 wherein said visor is provided with a locating flange in a top edge thereof to guidingly position said visor relative to ribs provided in an upper forehead section of said faceguard frame.

26. A headgear as claimed in claim 19 wherein said faceguard frame is provided with said ribbed cage section below said sighting opening, said ribbed cage section having a plurality of horizontal and transverse ribs, said ribs being of substantially triangular cross-section with their apex located exteriorly of said cage section and aligned with a cone of vision of said sighting opening.

27. A headgear as claimed in claim 19 wherein said faceguard frame is provided with a forehead section disposed above said sighting opening, said forehead section having a rib member rearwardly of a top edge thereof, an integrally formed frame attachment hinge member having a female connector section for receiving a male snap member therein to secure said frame attachment member to said helmet member, and a retention loop formed integral with said female connector, said loop being positioned about said rib member.

28. A headgear as claimed in claim 25 wherein said retention loop has a flexible throat opening disposed rearwardly thereof and extending about said female connector to lock said opening when said male snap member is engaged with said female connector, said faceguard frame being hingedly retained by said frame attachment member.

29. A protective headgear comprising a helmet member shaped to protect the top, rear, front and sides of a wearer's head; said helmet member having a rigid outer shell with an inner protective lining of shock absorbing material, a sizing harness secured to said helmet and disposed inwardly thereof, said harness having a height adjusting band [an] *and* a horizontal contour-adjusting band, and adjustable sizing means secured to said helmet and said adjusting bands to fit said bands on the head of a wearer and thereby spacing said head from said protective lining in at least some inner areas of said helmet member, and means to secure said helmet to a wearer's head, said inner protective lining being attached to said outer shell by rib fasteners, constructed of severable material, said rib fasteners having a ribbed stem member and a stem engaging cup member; said stem member being an elongated straight flat stem member having opposed transverse equidistantly spaced attachment ribs on opposed flat side walls of said stem, a flat transverse head at one end of said stem, and a tapered locating free end; said cup member having a recessed bottom wall with a straight rectangular slot for receiving said free end and a portion of said ribbed stem member therethrough, said cup having flange means extending outwardly from a top edge of a circumferential side wall thereof.

30. A headgear as claimed in claim 29 wherein said flange means is a circumferential flange entirely about said side wall.

31. A headgear as claimed in claim 30 wherein said stem engaging cup member is a circular cup member, and a pair of retention flexible shoulders, each shoulder disposed on opposed sides of said rectangular slot and having an inward inclination to engage with said stem between said ribs.

32. A headgear as claimed in claim 31 wherein said ribs have an outwardly sloping side wall and a transverse retention rear wall, said flexible shoulder being displaced outwardly by said sloping side wall when said stem is pushed through said rectangular slot.

33. A headgear as claimed in claim 32 wherein each of said flexible shoulders have a flat engaging top edge, said top edge engaging said transverse retention rear wall of said ribs to prevent said stem from being pulled back from said rectangular slot of said stem engaging cup.

34. A headgear as claimed in claim 33 wherein said side wall of said cup member is longer than the distance from a leading edge of a sloping side wall of a rib disposed on top of said pair of retention shoulders so that said stem can be severed at said leading edge so that said severed stem does not protrude beyond said circumferential flange of said cup.

35. A headgear as claimed in claim 34 wherein said stem member and cup member are molded from plastics material.

36. A headgear as claimed in claim 34 wherein said inner protective lining is formed of a rigid protective material, said rib fasteners securing said protective material to said outer shell, said cup member being disposed in circular bores formed in an inner surface of said protective material, said head of said stem resting on an outer surface of said outer shell with said stem extending through an aligned slot in said shell.

37. A faceguard frame for securement to a protective sports headgear, a visor of clear plastics material hingedly connected to said frame by pivot connections so that said visor may be hinged upwardly of said frame, and resilient lock means in opposed side sections of said frame to immovably secure said visor in its position of use in front of a wearer's face.

38. A faceguard frame as claimed in claim 37 wherein said frame is of a mesh-like construction and having a sighting opening in at least an eye region of the face of a wearer, said visor being hingeable upwardly of said sighting opening, said lock means immovably secured said visor in its position of use across said sighting opening.

39. A faceguard frame as claimed in claim 38 wherein said visor is a curved shape visor having hinge connection means adjacent opposed side end portions thereof for connection with a pivot post secured on opposed sides of said faceguard frame in an upper rear region thereof and lock connection means for connection with said lock means.

40. A faceguard frame as claimed in claim 39 wherein said hinge connection means is comprised of an elongated slot formed in said visor, said slot having a top vertical section to permit said visor to be displaced vertically for nesting and removal from visor locating ledges of said faceguard frame, and a rearwardly extending depending section to permit said visor to hinge upwardly and outwards.

41. A faceguard frame as claimed in claim 39 wherein said lock mean is provided by a retention bore formed in said visor and aligned with a retention head of a flexible retention finger secured to said faceguard frame.

42. A faceguard frame as claimed in claim 41 wherein said retention finger is integrally molded with said faceguard frame, said retention head having an outwardly protruding retention ledge forming a straight undercut edge under said ledge, said retention bore having a straight bottom sloping edge for mating retention with said undercut edge.

43. A faceguard frame as claimed in claim 40 wherein said visor locating ledges includes an upper support ledge formed on top of a rib cage section of said faceguard frame positioned below said sighting opening.

44. A faceguard frame as claimed in claim 43 wherein said visor is provided with a locating flange in a top edge thereof to guidingly position said visor relative to ribs provided in an upper forehead section of said faceguard frame.

45. A faceguard frame as claimed in claim 39 wherein said faceguard frame is provided with a ribbed cage section below said sighting opening, said ribbed cage section having a plurality of horizontal and transverse ribs, said ribs being of substantially triangular cross-section with their apex located exteriorly of said cage section and aligned with a cone of vision of said sighting opening.

*46. A headgear as claimed in claim 1 wherein said harness is comprised of a single contour horizontal adjusting band and a height adjusting band, a further adjustment member being secured to said height adjusting band to displace same.*

*47. A headgear as claimed in claim 46 wherein said horizontal contour band and said height adjusting band are band sections of a one-piece band.*

*48. A headgear as claimed in claim 1 wherein said connecting means is guidingly displaced in a guide channel formed in said inner protective lining, said guide channel being disposed to maintain said adjusting band in proper position inside said headgear.*

*49. A headgear as claimed in claim 48 wherein said attachment element is retained captive between an inner face of said outer shell and said protective lining and dis-*

*placeable therebetween to retain and displace said connecting means in said guide channel between said inner surface of said protective lining and said outer shell.*

*50. A headgear as claimed in claim 48 wherein said adjustment member and trough-like housing extends within said guide channel to displace said connecting means therein, said connecting means being a bridge member connected between said displaceable attachment end portion of said band and said attachment element.*

*51. A protective headgear comprising a helmet member for protecting a wearer's head, said helmet member having a protective shell and at least a horizontal flexible sizing band connected to said protective headgear;*

*an adjustable sizing device secured to said protective shell and said horizontal sizing band to provide proper fitting of said helmet on the head of a wearer;*

*said adjustable sizing device including an adjustment member which is accessible outwardly of said helmet member;*

*said horizontal sizing band having a connector secured to a displaceable portion of said band, said connector having an elongated flexible threaded member secured thereto;*

*said adjustment member including a thread engaging adjustment knob in threaded engagement with said threaded member to pull said threaded member through said knob to displace at least said displaceable portion of said band, said thread engaging adjustment knob being located in a trough-like housing secured to said protective shell with said threaded member extending through opposed walls of said housing and thereby retaining said knob captive in said housing.*

*52. A headgear as claimed in claim 51 wherein said connector is guidingly displaced in a guide channel formed in said protective headgear, said guide channel being disposed horizontally to maintain said horizontal flexible sizing band in proper position inside said protective shell.*

*53. A headgear as claimed in claim 52 wherein said trough-like housing extends within said guide channel, said trough-like housing having opposed end walls provided with a passage through which said threaded member extends.*

*54. A headgear as claimed in claim 53 wherein said connector is a bridge member, said longated flexible threaded member being secured to a free end of said bridge member, said trough-like housing being spaced from an inner surface of said protective headgear.*

* * * * *